(12) United States Patent
Niwa

(10) Patent No.: US 6,857,417 B2
(45) Date of Patent: Feb. 22, 2005

(54) FUEL INJECTION NOZZLE HAVING COATING LAYER AND MANUFACTURING METHOD THEREOF

(75) Inventor: Yutaka Niwa, Nagoya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/600,372

(22) Filed: Jun. 23, 2003

(65) Prior Publication Data
US 2004/0000601 A1 Jan. 1, 2004

(30) Foreign Application Priority Data

Jun. 28, 2002 (JP) .......................... 2002-189303

(51) Int. Cl.⁷ .............................................. F02M 41/00
(52) U.S. Cl. ................... 123/467; 123/533.11
(58) Field of Search ................. 123/467, 305; 239/585.1, 533.11; 427/446, 447, 109, 110, 236, 237

(56) References Cited

U.S. PATENT DOCUMENTS

| | | | | |
|---|---|---|---|---|
| 5,037,031 A | * | 8/1991 | Campbell et al. | 239/533.3 |
| 6,062,498 A | * | 5/2000 | Klopfer | 239/533.2 |
| 6,273,348 B1 | * | 8/2001 | Shouji et al. | 239/585.1 |
| 6,489,043 B1 | * | 12/2002 | Deevi et al. | 428/681 |
| 6,612,508 B2 | * | 9/2003 | Lambert | 239/533.12 |
| 6,695,233 B2 | * | 2/2004 | Sekine et al. | 239/585.1 |
| 6,715,693 B1 | * | 4/2004 | Dam et al. | 239/88 |

FOREIGN PATENT DOCUMENTS

| | | |
|---|---|---|
| JP | 9-112392 | 4/1997 |
| JP | 3156610 | 2/2001 |

\* cited by examiner

Primary Examiner—Mahmoud Gimie
(74) Attorney, Agent, or Firm—Nixon & Vanderhye PC

(57) ABSTRACT

A coating layer made of a lipophobic material is provided in a distal end of a nozzle needle of a fuel injection nozzle. The coating layer is formed by soaking the distal end of the nozzle needle in a liquid state lipophobic material.

14 Claims, 8 Drawing Sheets

US 6,857,417 B2

FUEL INJECTION NOZZLE HAVING COATING LAYER AND MANUFACTURING METHOD THEREOF

CROSS REFERENCE TO RELATED APPLICATION

This application is based on and incorporates herein by reference Japanese Patent Application No. 2002-189303 filed on Jun. 28, 2002.

BACKGROUND OF THE INVENTION

1. Field of the Invention

The present invention relates to a fuel injection nozzle for an internal combustion engine and a manufacturing method thereof.

2. Description of Related Art

A direct fuel injection system is known in the art. In the direct fuel injection system, fuel is directly injected into each corresponding combustion chamber of an internal combustion engine to reduce fuel consumption and emissions and to increase engine power. In the direct fuel injection system, appropriate atomization of fuel is an important factor to be considered to improve combustion characteristics in the combustion chamber. In an injector of the fuel injection system, initiation of fuel injection and stop of fuel injection need to be effectively performed through opening and closing of an injection hole of the injector. However, fuel generally includes impurities, such as high boiling components, additives or water. Due to influence of, for example, the ambient temperature, the impurities can be adhered to and accumulated in the injection hole or a region around the injection hole as debris. When the debris is adhered to and accumulated in the injection hole or the region around the injection hole, flow of fuel is disturbed, and thus injection of fuel through the injector can not be precisely controlled.

To address this disadvantage, for example, Japanese Unexamined Patent Publication No. 9-112392 discloses a technique for forming a coating, which is made of a lipophobic material, in an outer wall of a fuel injection nozzle and an inner wall of the injection hole. With this coating, it is possible to restrain accumulation of debris in the fuel injection nozzle, particularly in the fuel injection hole and the region around the fuel injection hole, so that a reduction in the amount of fuel injected from the injection hole or a change in a spray pattern of fuel injected from the injection hole is advantageously restrained.

However, debris can be formed from residual fuel in an interior of the nozzle, i.e., in a space defined between a nozzle needle and a nozzle body. That is, the debris can be adhered not only to the outer wall of the nozzle body and the inner wall of the injection hole but also to the nozzle needle. Thus, in the case of the Japanese Unexamined Patent Publication No. 9-112392 where the coating layer is formed in the outer wall of the fuel injection nozzle and the inner wall of the injection hole, it is not possible to restrain accumulation of the debris around an engaging portion of the nozzle needle. Particularly, in the case of a direct injection engine, hot combustion gas is introduced into the interior of the nozzle through the injection hole at the time of combustion. Thus, for example, residual fuel, which remains in the space between the nozzle needle and the nozzle body, can be carbonized by the heat and can be accumulated as debris in the distal end of the nozzle needle.

When the debris is accumulated in the nozzle needle, flow of fuel in the injection nozzle is agitated, or flow of fuel is disturbed. As a result, the amount of fuel injected from the injection hole could be disadvantageously reduced, or the spray pattern of fuel injected from the injection hole can be disadvantageously changed. Furthermore, when debris is accumulated around the engaging portion between the nozzle needle and the nozzle body, fluid tightness at the engaging portion could be possibly deteriorated.

SUMMARY OF THE INVENTION

The present invention addresses the above disadvantages. Thus, it is an objective of the present invention to provide a fuel injection nozzle, which effectively restrains adhesion and accumulation of debris in a nozzle needle.

It is another objective of the present invention to provide a manufacturing method of such a fuel injection nozzle.

To achieve the objectives of the present invention, there is provided a fuel injection nozzle that includes a nozzle body and a nozzle needle. The nozzle body includes a fuel injection hole and a valve seat. The valve seat is located on an inlet side of the fuel injection hole. The nozzle needle includes an engaging portion, which is seatable against the valve seat to stop fuel injection through the injection hole. The nozzle needle has a coating layer in an outer wall of the nozzle needle. The coating layer is made of a lipophobic material.

To achieve the objectives of the present invention, there is also provided a manufacturing method of a fuel injection nozzle, which includes a nozzle body and a nozzle needle. The nozzle body includes a fuel injection hole and a valve seat, and the nozzle needle includes an engaging portion, which is provided in a distal end of the nozzle needle and is seatable against the valve seat to stop fuel injection through the injection hole. In the manufacturing method, the distal end of the nozzle needle is soaked in a liquid state lipophobic material to a predetermined depth to apply the lipophobic material to the distal end of the nozzle needle.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

(First Embodiment)

A fuel injection nozzle according to a first embodiment of the present invention will be described. Here, the fuel injection nozzle is used in an injector of a direct injection gasoline engine (internal combustion engine).

Figure 3:
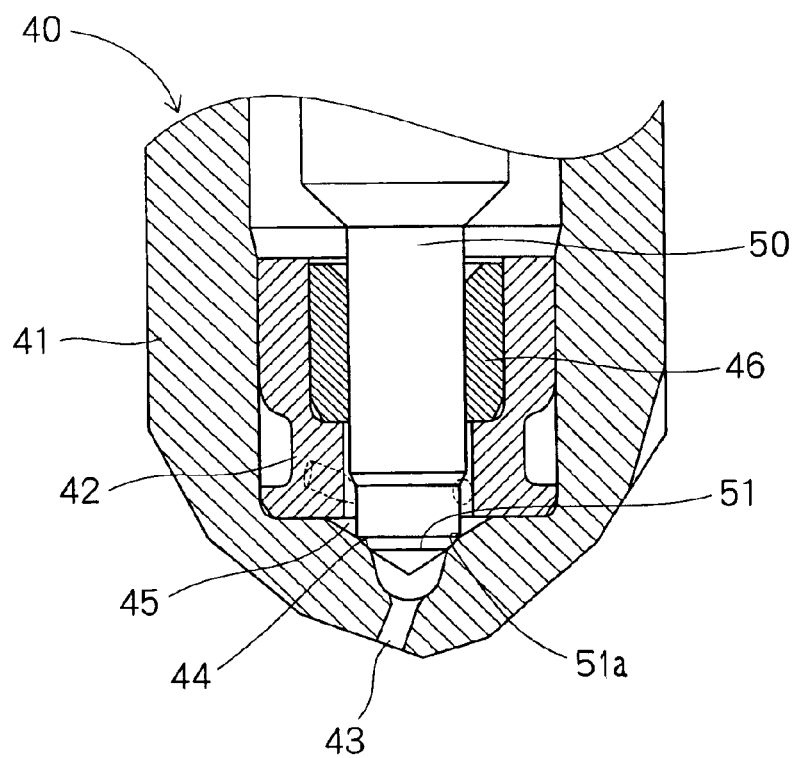
FIG. 3 is an enlarged schematic cross sectional view showing a region around the nozzle arrangement of the injector according to the first embodiment.
Figure 2:
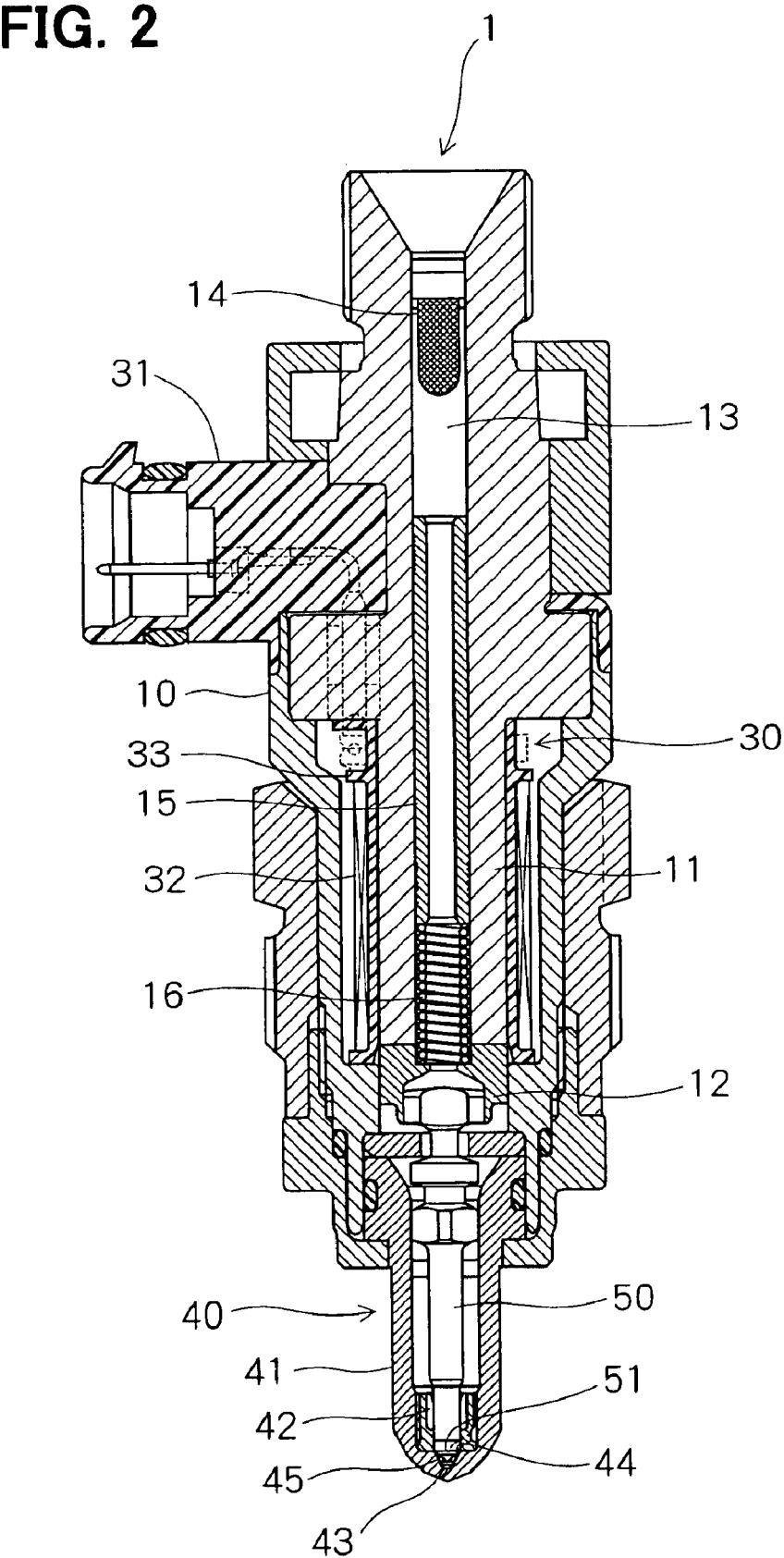
FIG. 2 is a schematic cross sectional view of the injector according to the first embodiment.
Figure 4:
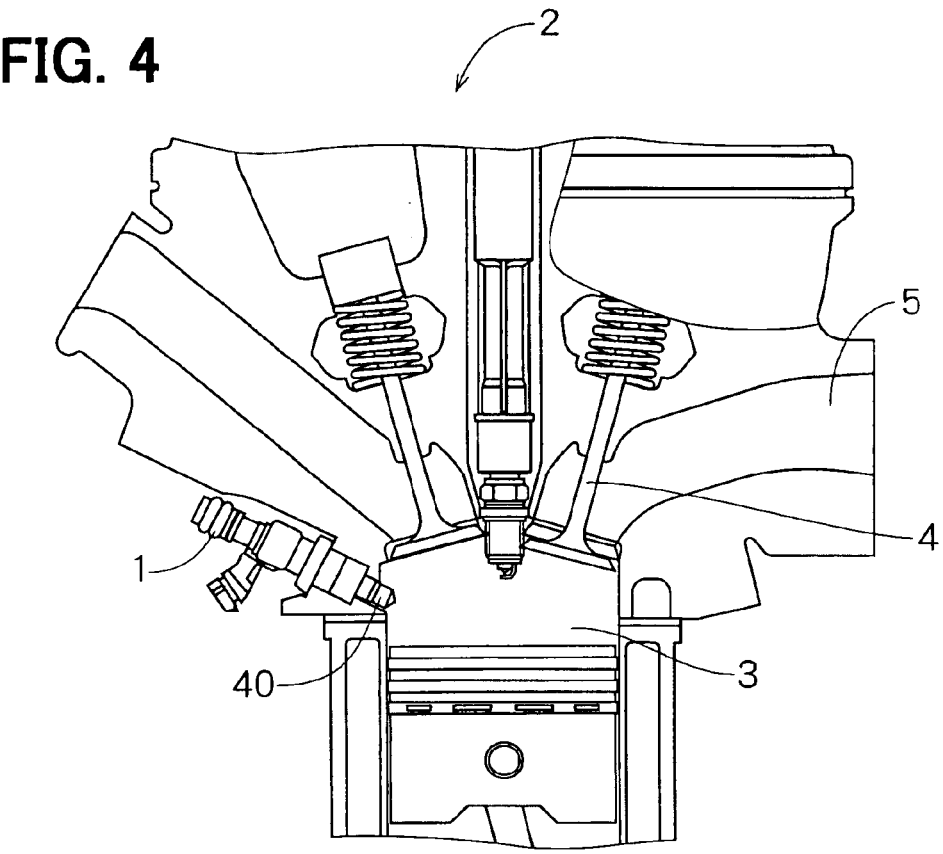
FIG. 4 is a schematic view showing a direct injection gasoline engine having the injector according to the first embodiment of the present invention.

With reference to FIGS. 2 and 3, the injector 1 includes a housing 10, a stationary core 11, an electromagnetic drive arrangement 30 and a nozzle arrangement (serving as the fuel injection nozzle) 40. With reference to FIG. 4, in a case of the direct injection engine 2, a distal end of the nozzle arrangement 40 of the injector 1 is exposed in a combustion chamber 3 of the engine 2. The injector 1 injects fuel into the air, which is supplied from an intake air passage 5 to the combustion chamber 3 when an intake valve 4 is opened.

With reference to FIG. 2, the housing 10 is generally cylindrical and receives the stationary core 11, a movable core 12 and the electromagnetic drive arrangement 30. The stationary core 11 is made of a magnetic material and is shaped as a generally cylindrical body that defines a fuel passage 13 therein. A filter member 14, an adjusting pipe 15 and a spring 16 are arranged in the fuel passage 13 of the stationary core 11. The filter member 14 removes debris contained in fuel supplied from a fuel pump (not shown). The adjusting pipe 15 is press fitted into the stationary core 11. By adjusting an amount of insertion of the adjusting pipe 15 in the stationary core 11, an urging force of the spring 16 is adjusted.

The moveable core 12 is made of a magnetic material. The movable core 12 is received in the housing 10 on a distal end side (i.e., the lower end side in FIG. 2) of the stationary core 11. The movable core 12 is formed integrally with a nozzle needle 50 of the nozzle arrangement 40 and axially reciprocable together with the nozzle needle 50. A proximal end (i.e., upper end in FIG. 2) of the movable core 12 is engaged with the spring 16, and the movable core 12 is urged toward the nozzle arrangement 40 by the spring 16.

The electromagnetic drive arrangement 30 is arranged between the housing 10 and the stationary core 11. The electromagnetic drive arrangement 30 includes a connector 31, a coil 32 and a spool member 33. The connector 31 is electrically connected to an external power supply means (not shown), which supplies electric power to the coil 32. When the coil 32 receives electric power from the power supplying means through the connector 31, the coil 32 generates a magnetic field. The spool member 33 is made of a resin material, and the coil 32 is wound around the spool member 33. The magnetic field generated by the coil 32 forms a magnetic circuit through the housing 10, the stationary core 11 and the movable core 12, so that a magnetic attractive force is generated between the stationary core 11 and the moveable core 12. Therefore, the moveable core 12 is attracted to the stationary core 11.

As shown in FIG. 3, the nozzle arrangement 40 includes a nozzle body 41, the nozzle needle 50 and a swirler 42. The nozzle body 41 is shaped as a generally cylindrical body and has a fuel injection hole 43 at the distal end of the nozzle body 41. A valve seat 44 is formed in an inner surface of the nozzle body 41 at an inlet side of the fuel injection hole 43. The swirler 42 is shaped as a generally cylindrical body and reciprocably supports the nozzle needle 50 therein. An outer peripheral surface of the nozzle needle 50 and an inner peripheral surface of the swirler 42 define a swirl chamber 45, which provides a swirling force to fuel. A proximal end (i.e., the upper end in FIG. 2) of the nozzle needle 50 is connected to the movable core 12. An engaging portion 51 is formed in a distal end (i.e., the lower end in FIG. 2) of the nozzle needle 50. The engaging portion 51 is engageable with the valve seat 44 of the nozzle body 41. The nozzle needle 50 is reciprocably supported by a guide member 46 arranged in the swirler 42.

Figure 1:
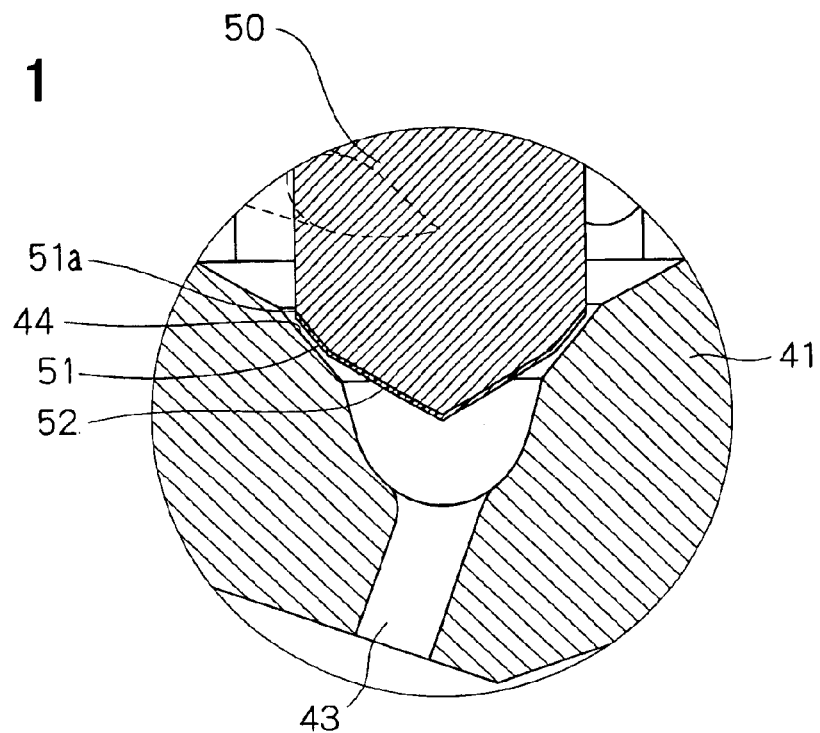
FIG. 1 is an enlarged schematic cross sectional view showing a region around a nozzle arrangement of an injector according to a first embodiment of the present invention.

As shown in FIG. 1, a coating layer 52 is formed in the distal end of the nozzle needle 50. The coating layer 52 extends distally from an upstream end (upstream edge) 51*a* of the engaging portion 51 to an apex (lower end apex in FIG. 1) of the distal end of the nozzle needle 50, so that the coating layer 52 covers the engaging portion 51 of the nozzle needle 50. The coating layer 52 is made of a lipophobic material and is formed in the outer wall of the nozzle needle 50 such that the coating layer 52 has a generally uniform thickness. In the present embodiment, fluorocarbon resin, such as polytetrafluoroethylene, is used as the lipophobic material of the coating layer 52.

Figure 5:
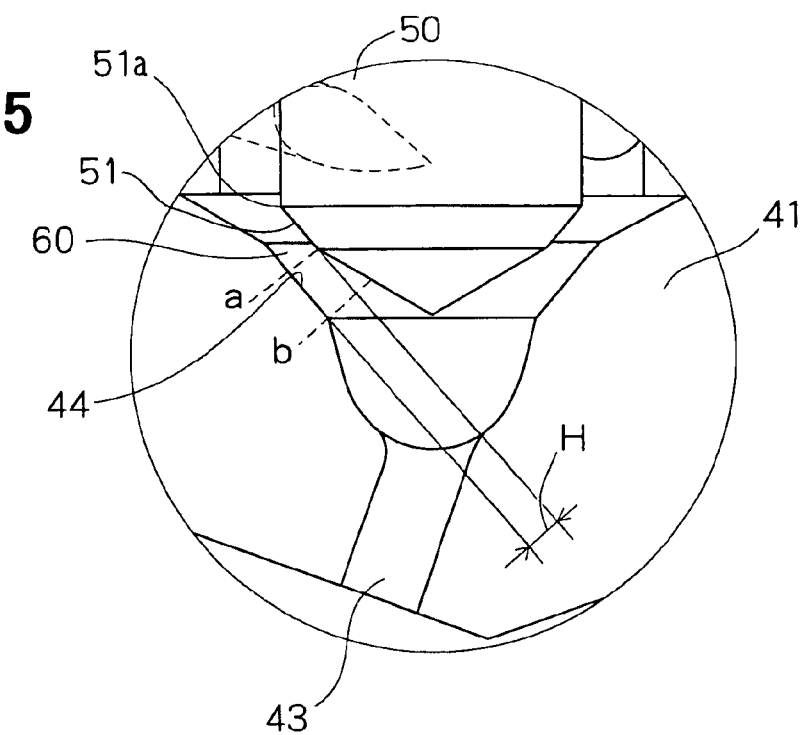
FIG. 5 is a schematic view showing a region around the nozzle arrangement of the injector according to the first embodiment.
Figure 6:
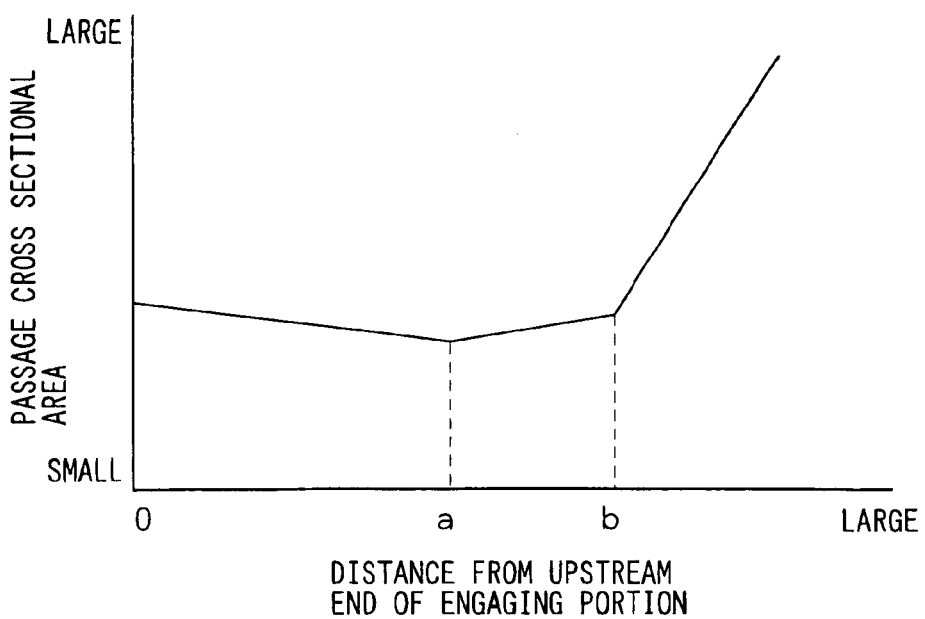
FIG. 6 is a graph showing relationship between a distance from an upstream end of an engaging portion of a nozzle body of the injector and a passage cross sectional area according to the first embodiment.

The thickness T of the coating layer 52 is set as follows. As shown in FIG. 5, when the engaging portion 51 of the nozzle needle 50 is lifted away from the valve seat 44 of the nozzle body 41, a fuel passage 60, through which fuel is conducted, is formed between the nozzle needle 50 and the nozzle body 41. A passage cross sectional area of the fuel passage 60 changes from the engaging portion 51 to the apex of the distal end of the nozzle needle 50 in a manner shown in FIG. 6.

Figure 7:
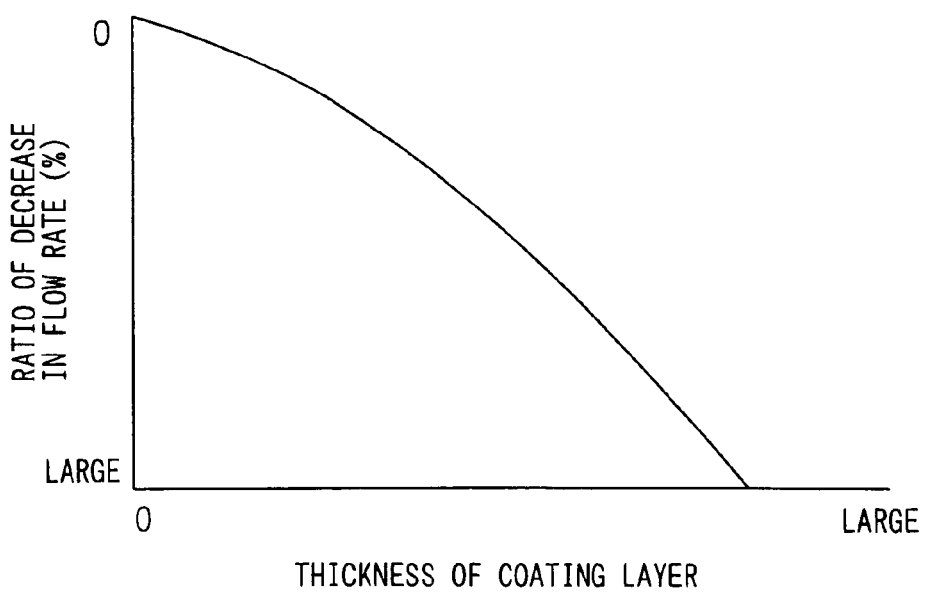
FIG. 7 is a graph showing relationship between a thickness of a coating layer and a ratio of decrease in flow rate.

In the fuel passage 60, when the amount of lift of the nozzle needle 50 is maximized, i.e., when the nozzle needle 50 is positioned closest to the stationary core 11, a distance H between the nozzle needle 50 and the nozzle body 41 is measured at a narrowest cross sectional point (i.e., the point where the passage cross sectional area is minimized) "a" in the fuel passage defined between the nozzle body 41 and the nozzle needle 50 on a downstream side of the upstream end 51a of the engaging portion 51. When the distance H at the point "a" is defined in the above manner, the thickness T of the coating layer 52 is defined by $T \leq 0.01 \times H$. The thickness T is defined in this way for the following reason. That is, when the thickness of the coating layer 52 is increased, the passage cross sectional area of the fuel passage 60 between the nozzle needle 50 and the nozzle body 41 is decreased. For example, when the thickness of the coating layer 52 is increased, as shown in FIG. 7, the flow rate of fuel, which passes through the fuel passage 60, is reduced. The ratio of decrease in the flow rate of fuel shown in FIG. 7 refers the ratio of decrease in the flow rate of fuel, which is caused by presence of the coating layer 52 on the distal end of the nozzle needle 50, relative to the flow rate of fuel, which is measured without the coating layer 52 on the distal end of the nozzle needle 50 and is regarded as 1 (or 100%). The thickness of the coating layer 52 is not determined as the absolute thickness (or fixed thickness) and is determined based on the shape or the geometrical parameter of the nozzle needle 50 and/or nozzle body 41, such as, the distance between the nozzle needle 50 and the nozzle body 41, the outer diameter of the engaging portion 51 of the nozzle needle 50 or the inner diameter of the valve seat 44 of the nozzle body 41. Therefore, $T \leq 0.01 \times H$ is selected to make the distance H between the nozzle needle 50 and the nozzle body 41 sufficiently larger than the thickness of the coating layer 52 when the amount of lift of the nozzle needle 50 is maximized.

Manufacturing method (first exemplary manufacturing process) of the nozzle arrangement 40, particularly the nozzle needle 50 of the first embodiment will be described.

Figure 8:
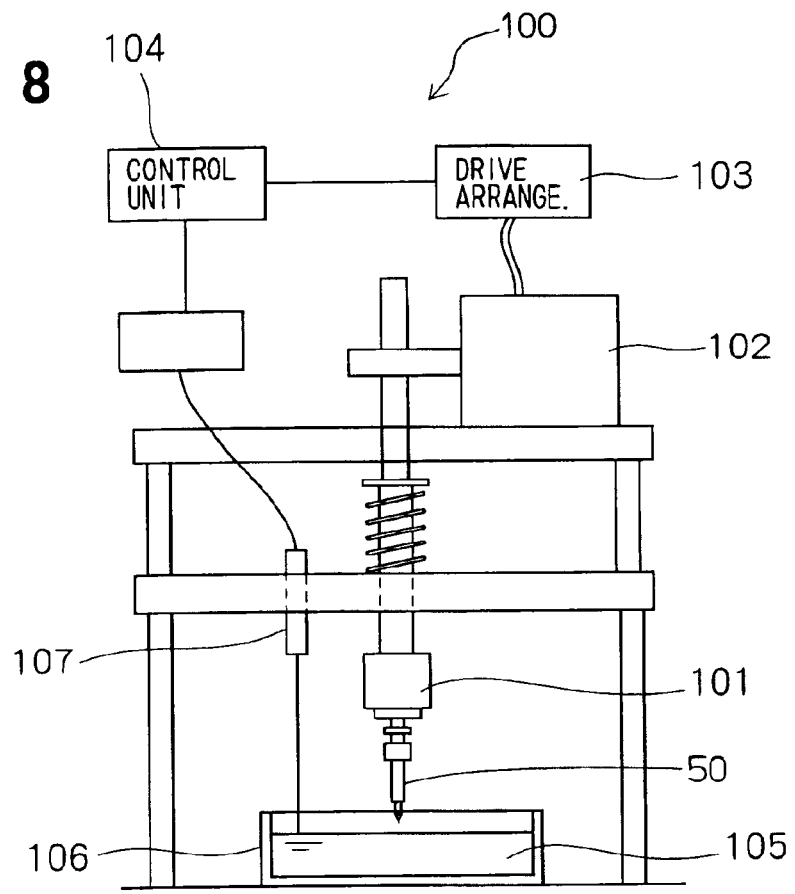
FIG. 8 is a schematic view showing manufacturing of a nozzle needle of the injector according to the first embodiment, depicting one manufacturing state where a lipophobic material is applied to the nozzle needle.

With reference to FIG. 8, the nozzle needle 50, which is formed into a predetermined shape, is attached or connected to a connector 101 of a manufacturing device 100. The connector 101 is connected to a stepping motor 102. The connector 101 and the nozzle needle 50 connected thereto are vertically reciprocable by the stepping motor 102 driven by a motor drive arrangement 103 in FIG. 8. The motor drive arrangement 103 is connected to a control unit 104. A soaking tank 106 is arranged below the connector 101. The soaking tank 106 receives or stores the lipophobic material 105 in the liquid state. A liquid level of the lipophobic material 105 received in the soaking tank 106 is detected through an optical distance measuring sensor 107. The optical distance measuring sensor 107 is connected to the control unit 104, and the control unit 104 drives the stepping motor 102 based on the liquid level of the lipophobic material 105 detected through the optical distance measuring sensor 107. In this way, the lipophobic material is applied to a predetermined extent of the nozzle needle 50.

After the nozzle needle 50 is connected to the connector 101, the connector 101 and the nozzle needle 50 are moved by the stepping motor 102 in a downward direction in FIG. 8, so that the distal end of the nozzle needle 50 is soaked into the lipophobic material 105 received in the soaking tank 106. When the distal end of the nozzle needle 50 is soaked in the lipophobic material 105 to a predetermined depth, the lipophobic material is applied to the distal end of the nozzle needle 50. The lipophobic material is provided in the liquid form in the soaking tank 106 by, for example, dissolving the lipophobic material into solvent. Therefore, the lipophobic material has liquidity until the solvent is dried. By appropriately setting the solvent, into which the lipophobic material is dissolved, a time period required for drying the solvent can be adjusted.

Figure 9:
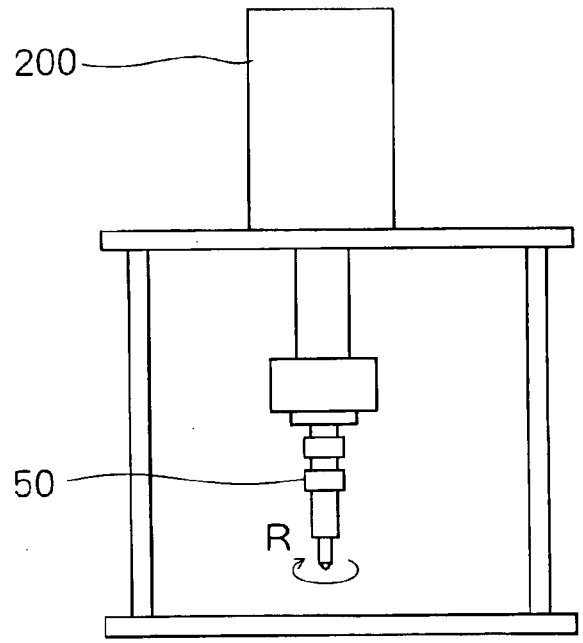
FIG. 9 is a schematic view showing the manufacturing of the nozzle needle of the injector according to the first embodiment, depicting another manufacturing state where the nozzle needle is rotated about its axis.

After the application of the lipophobic material to the distal end of the nozzle needle 50, the nozzle needle 50 is rotated. As shown in FIG. 9, the proximal end of the nozzle needle 50 is connected to a motor 200, and the nozzle needle 50 is rotated when the motor 200 is rotated. The rotation of the nozzle needle 50 is performed before the solvent dries (i.e., when the lipophobic material has liquidity). When the motor 200 is rotated, the nozzle needle 50 is rotated about its axis in a circumferential direction of the nozzle needle 50, i.e., in a direction of arrow R in FIG. 9. In this way, centrifugal force is applied to the liquid state lipophobic material, and thus the applied liquid state lipophobic material is thinly and uniformly spread along an external wall of the nozzle needle 50. Furthermore, excess lipophobic material is removed from the nozzle needle 50 by the centrifugal force generated by the rotation of the nozzle needle 50.

Figure 10:
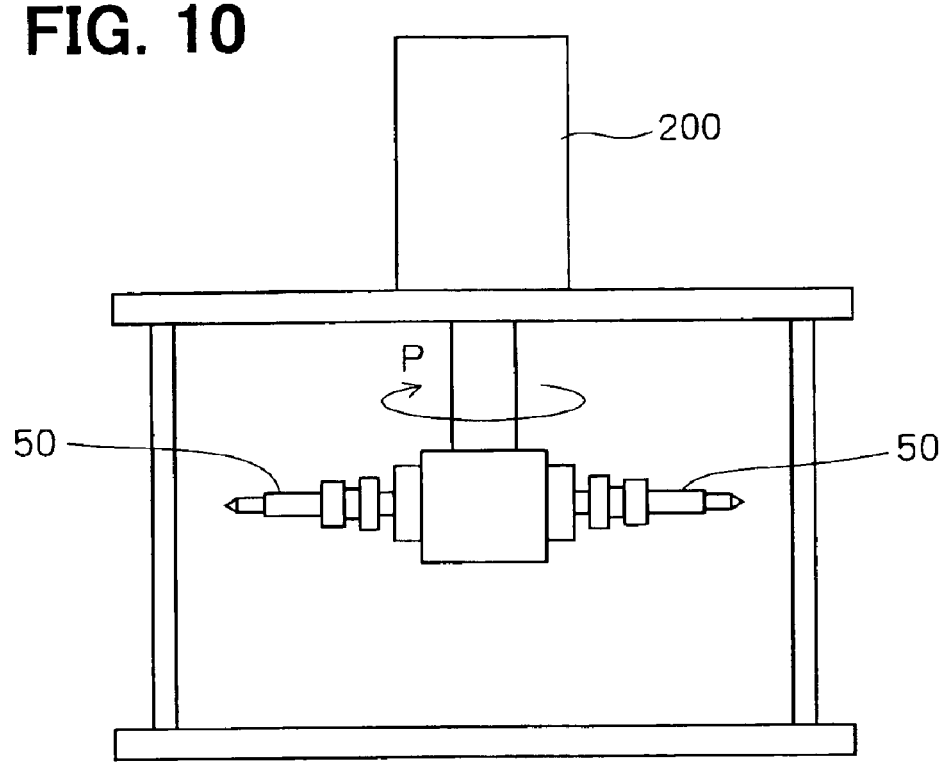
FIG. 10 is a schematic view showing the manufacturing of the nozzle needle of the injector according to the first embodiment, depicting another manufacturing state where the nozzle needle is rotated about a perpendicular axis, which is perpendicular to the axis of the nozzle need.

After the rotation of the nozzle needle 50 about the axis of the nozzle needle 50 in the circumferential direction, the nozzle needle 50 is rotated about a perpendicular axis, which is perpendicular to the axis of the nozzle needle 50, in a direction of P in FIG. 10 while the proximal end of the nozzle needle 50, which is opposite to the distal end where the lipophobic coating is applied, is supported. In this way, similar to the case shown in FIG. 9, the liquid state lipophobic material is thinly and uniformly applied to the nozzle needle 50 by the centrifugal force. Furthermore, by rotation of the nozzle needle 50 in the manner described with reference to FIGS. 9 and 10, the lipophobic material is thinly and uniformly applied to the nozzle needle 50, and contact between the lipophobic material and the air is promoted. Thus, evaporation of the solvent is promoted to dry the coating layer 52. The manufacturing steps or processes described with reference to FIGS. 8 to 10 can be performed as a series of manufacturing steps using the same device.

Figure 11:
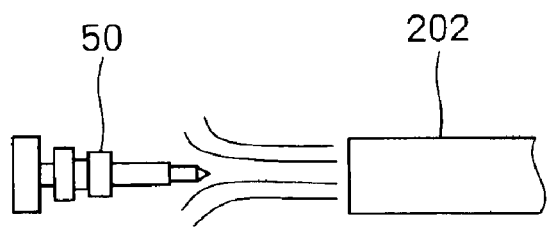
FIG. 11 is a schematic view showing the manufacturing of the nozzle needle of the injector according to the first embodiment, depicting another manufacturing state where the air is blown from a blower toward a distal end of the nozzle needle.

After the application of the lipophobic material to the distal end of the nozzle needle 50, the air can be blown from a blower 202 toward the distal end of the nozzle needle 50, as shown in FIG. 11 (second exemplary manufacturing process). In this way, the coating layer 52, which is made from the liquid state lipophobic material, can be thinly and uniformly formed and can be dried by the air flow. Furthermore, the air can be blown toward the distal end of the nozzle needle 50 in the manner described with reference to FIG. 11 while the nozzle needle 50 is rotated about its axis in the manner described with reference to FIG. 9.

Furthermore, the coating layer 52 can be formed through the following process (third exemplary manufacturing process).

After the application of the lipophobic material to the distal end of the nozzle needle 50, the applied lipophobic material is dried to evaporate the solvent. In this way, the coating layer 52, which is made of the lipophobic material, is formed in the distal end of the nozzle needle 50. The coating layer 52 is formed through coating of the lipophobic material and drying of the lipophobic material, so that location (or extent) of the coating layer 52 may not be confined in a predetermined region, and the thickness of the coating layer 52 may not be uniform in some cases. Because of this, the coating layer 52 is cut or machined to adjust at least one of an area of the lipophobic material and a thickness of the lipophobic material. In this way, a portion of the coating layer 52, which is located outside the predetermined region, is removed, and the thickness of the coating layer 52 is adjusted to the predetermined thickness. Thus, the predetermined coating layer 52 is formed in the distal end of the nozzle needle 50.

Two or all of the first to third exemplary manufacturing processes can be performed in any combination. For example, after formation of the coating layer 52 on the nozzle needle 50 through the first exemplary manufacturing process, the coating layer 52 can be cut through the third exemplary manufacturing process.

Operation of the injector 1 according to the present embodiment will be described.

Fuel, which is supplied to the injector 1 from the fuel pump (not shown), is supplied to the nozzle arrangement 40 through the filter member 14 and the interior of the adjusting pipe 15. When the electric power is not supplied to the coil 32 of the electromagnetic drive arrangement 30, the nozzle needle 50 is urged by urging force of the spring 16 in a valve closing direction of the nozzle needle 50, so that the engaging portion 51 of the nozzle needle 50 is seated against the valve seat 44 of the nozzle body 41. Thus, the fuel flow is stopped, and injection of fuel from the injection hole 43 is stopped.

When the electric power is supplied to the coil 32 of the electromagnetic drive arrangement 30, the electromagnetic circuit is formed, and thus electromagnetic attractive force is generated between the stationary core 11 and the movable core 12. The movable core 12 is therefore attracted by the electromagnetic force toward the stationary core 11 against the urging force of the spring 16, and the nozzle needle 50 is lifted in the upward direction in FIG. 2. When the nozzle needle 50 is lifted, the engaging portion 51 is spaced apart from the valve seat 44, and fuel is injected into the corresponding combustion chamber 3 from the injection hole 43 through the fuel passage 60, which is defined between the engaging portion 51 and the valve seat 44.

When supply of the electric power to the coil 32 of the electromagnetic drive arrangement 30 is stopped, the electromagnetic attractive force disappears. Thus, the nozzle needle 50 is moved by the urging force of the spring 16 toward the injection hole 43. Then, the engaging portion 51 of the nozzle needle 50 is seated against the valve seat 44 of the nozzle body 41. In this way, fuel injection from the injection hole 43 is stopped.

As described above, according to the first embodiment of the present invention, the coating layer 52, which is made of the lipophobic material, is formed in the distal end of the nozzle needle 50. Therefore, even when debris or the like is adhered to the nozzle needle 50, the debris or the like is removed from the nozzle needle 50 by fuel, which flows along the nozzle needle 50. As a result, even in the case of the direct injection engine 2 where the nozzle arrangement 40 is exposed in the combustion chamber 3 and is thus exposed to the hot combustion gas, the adhesion and accumulation of the debris or the like to the nozzle needle 50 can be restrained. Thus, the amount of fuel injected from the injection hole 43, the angle of fuel injection from the injection hole 43 or a fuel spray pattern of fuel injected from the injection hole 43 will not be substantially changed, and the same fuel injection characteristics can be maintained.

(Second Embodiment)

A nozzle arrangement of the injector according to a second embodiment of the present invention will be described with reference to FIG. 12. Components similar to those discussed with reference to the first embodiment will be indicated by the same numerals and will not be further described.

Figure 12:
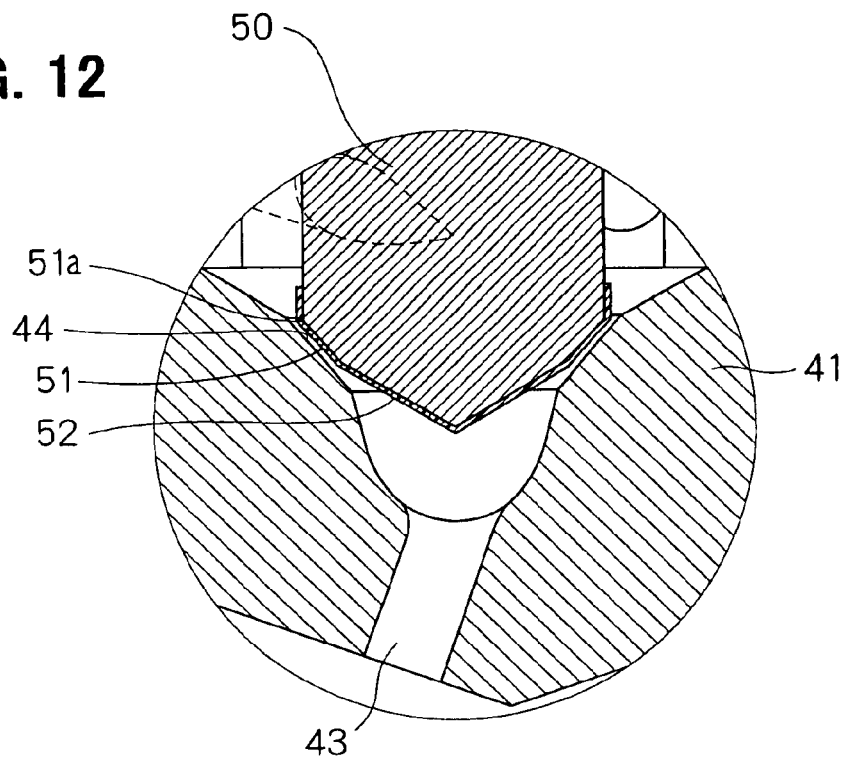
FIG. 12 is an enlarged schematic cross sectional view showing a region around a nozzle arrangement of an injector according to a second embodiment of the present invention.

In the second embodiment, with reference to FIG. 12, a coating layer 52 extends beyond the upstream end 51a of the engaging portion 51 on an upstream side of the upstream end 51a of the engaging portion 51 of the nozzle needle 50. That is, the extent of the engaging portion 51 is included in the extent of the coating layer 52 (i.e., the engaging portion 51 is covered with the coating layer 52). When debris is adhered to the engaging portion 51, fluid tightness between the nozzle body 41 and the nozzle needle 50 is reduced, and thus fuel could be injected at time other than the predetermined timing. In the case where the coating layer 52 is provided in the engaging portion 51, even when debris is adhered to the engaging portion 51, the debris adhered to the engaging portion 51 can be removed by the fuel flow. Thus, the fluid tightness between the nozzle body 41 and the nozzle needle 50 can be maintained.

(Third Embodiment)

A nozzle arrangement of the injector according to a third embodiment of the present invention will be described with reference to FIG. 13. Components similar to those discussed with reference to the first embodiment will be indicated by the same numerals and will not be further described.

Figure 13:
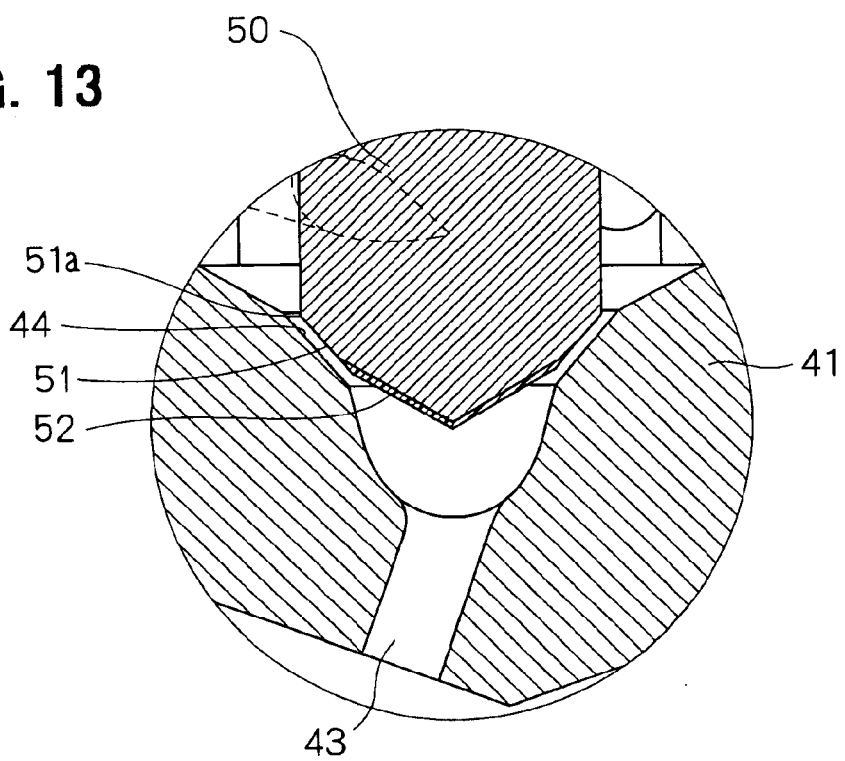
FIG. 13 is an enlarged schematic cross sectional view showing a region around a nozzle arrangement of an injector according to a third embodiment of the present invention.

In the third embodiment, with reference to FIG. 13, a coating layer 52 is provided on a downstream side of the engaging portion 51 of the nozzle needle 50. In other words, the coating layer 52 extends distally from a predetermined point of the nozzle needle 50, which is located distally of the engaging portion 51. That is, the coating layer 52 is formed only around the apex of the distal end of the nozzle needle 50. Debris tends to adhere to the distal end of the nozzle needle 50, which is exposed to hot combustion gas introduced into the combustion chamber 3. Thus, accumulation of debris in the distal end of the nozzle needle 50 can be restrained by the coating layer 52 provided around the distal end of the nozzle needle 50.

(Fourth Embodiment)

Figure 14:
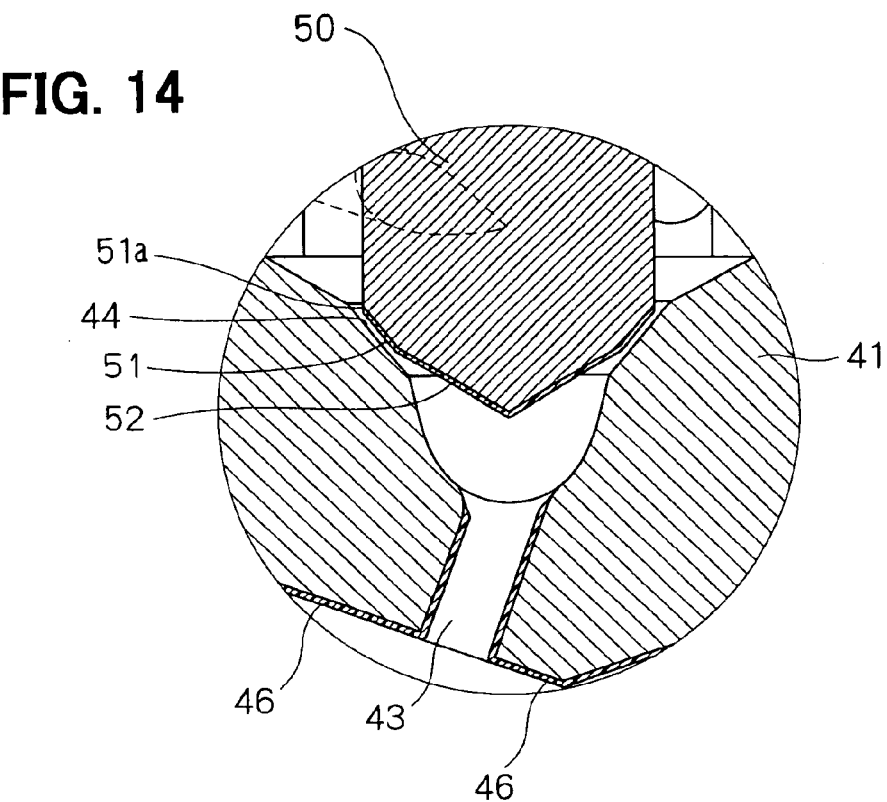
FIG. 14 is an enlarged schematic cross sectional view showing a region around a nozzle arrangement of an injector according to a fourth embodiment of the present invention.

A nozzle arrangement of the injector according to a fourth embodiment of the present invention will be described with reference to FIG. 14. Components similar to those discussed with reference to the first embodiment will be indicated by the same numerals and will not be further described.

In the fourth embodiment, in addition to the coating layer 52 formed in the nozzle needle 50, a coating layer 46 is formed in the nozzle body 41. The coating layer 46, which is formed in the nozzle body 41, extends from an external wall of the nozzle body 41 to an inner wall of the injection hole 43. By providing the coating layer 46 in the nozzle body 41, debris adhered to an outlet opening of the injection hole 43 can be removed by the fuel flow. Thus, accumulation of debris in the injection hole 43 and its adjacent region can be restrained, and thus a change in the amount of fuel injected from the injection hole 43 or a change in the spray patter of fuel injected from the injection hole 43 can be restrained.

(Fifth Embodiment)

A nozzle arrangement of the injector according to a fifth embodiment of the present invention will be described with reference to FIG. 15.

Figure 15:
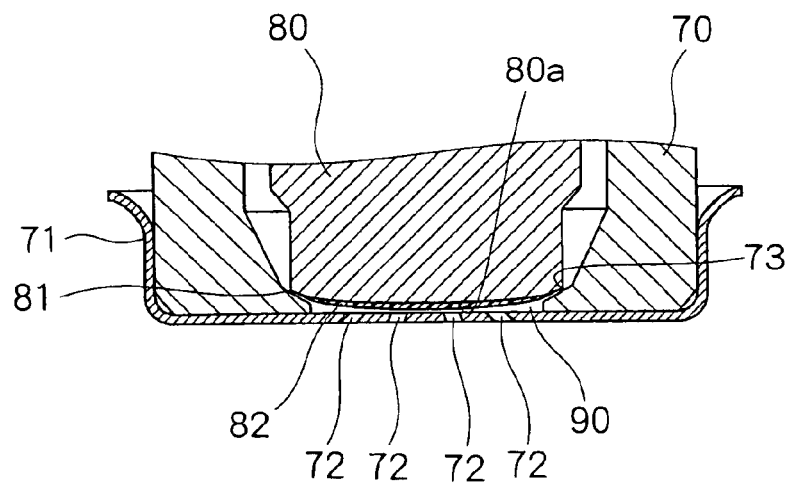
FIG. 15 is an enlarged schematic cross sectional view showing a region around a nozzle arrangement of an injector according to a fifth embodiment of the present invention.

In the fifth embodiment, a nozzle plate 71 is provided to a nozzle body 70 in a manner shown in FIG. 15. A plurality of injection holes 72 is formed through the nozzle plate 71, and the nozzle plate 71 is secured to an outer peripheral portion of the nozzle body 70, for example, by welding. An engaging portion 81 of a nozzle needle 80 is engageable with a valve seat 73 formed in an inner peripheral portion of the nozzle body 70. A distal end surface 80a of the nozzle needle 80, which is opposed to the nozzle plate 71, is formed as a flat surface or a slightly curved surface. Thus, a generally flat space 90 is formed between the end surface 80a of the nozzle needle 80 and the nozzle plate 71.

A coating layer 82 is formed in the end surface 80a of the nozzle needle 80. Similar to the first embodiment, the coating layer 82 is formed from the lipophobic material, such as polytetrafluoroethylene. The coating layer 82 of the generally uniform thickness is formed in the end surface 80a of the nozzle needle 80. In the fifth embodiment, influences of the thickness of the coating layer 82 on the flow of fuel are relatively small, so that it is not required to strictly limit the thickness of the coating layer 82 in the manner described with reference to the first embodiment.

When the engaging portion 81 is lifted away from the valve seat 73, fuel, which has passed through the space between the nozzle needle 80 and the nozzle body 70, is radially inwardly supplied to the space 90 from various directions. Thus, fuel supplied to the space 90 in one direction collides with fuel supplied to the space 90 in another direction. Therefore, the flow of fuel in the space 90 is agitated, and thus atomization of the fuel injected from the injection holes 72 is promoted. A distance "h" between the end surface 80a of the nozzle needle 80 and the nozzle plate 71, which cooperate together to define the space 90, is defined by:

$$h \leq 1.5 \times d,$$

where "d" is an inner diameter of the injection hole 72. When the distance "h" is reduced, the flatness of the space 90 is increased, so that the collision of fuel in the space 90 and the atomization of fuel are promoted.

On the other hand, when the "h" is defined in the above manner by $h \leq 1.5 \times d$, the distance between the nozzle plate 71 and the end surface 80a of the nozzle needle 80 is reduced. Because of this, when the fuel injection nozzle of the present embodiment is used in the direct injection engine, hot combustion gas enters the space 90. Therefore, fuel, which remains in the space 90, can be carbonized and can be adhered to the end surface 80a of the nozzle needle 80. Thus, when the coating layer 82 is formed in the end surface 80a, adhesion of debris to the end surface 80a can be restrained.

In the fifth embodiment, as described above, the coating layer 82 is formed in the end surface 80a of the nozzle needle 80, so that debris adhered to the end surface 80a of the nozzle needle 80 is removed by the fuel flow. Thus, even when the injector, which has the nozzle needle 80 and the nozzle plate 71 arranged in close proximity to each other, is used in the direct injection engine, debris is not likely to be adhered to and accumulated in the end surface 80a of the nozzle needle 80. As a result, the collision of fuel in the space 90 is not prohibited by the debris adhered to the end surface 80a of the nozzle needle 80. Thus, it is possible to restrain a change in the amount of fuel injected from the injection holes 72 caused by the adhesion of debris or a change in the spray patter of fuel injected from the injection holes 72 caused by adhesion of debris.

In the above described embodiments, the injector, which includes the fuel injection nozzle (i.e., the nozzle arrangement) of the present invention, is applied to the direct injection gasoline engine. However, the injection nozzle of the present invention is not limited to the gasoline engine and can be applied to an injector of a direct injection diesel engine.

Furthermore, the injection nozzle of the present invention is not limited to the direct injection engine and can be applied to an injector of an engine of a premixed combustion type. Even in this case, the adhesion and accumulation of debris in the nozzle needle can be restrained, and a change in the fuel injection characteristics can be restrained.

Furthermore, in the above embodiments of the present invention, the nozzle needle is discussed in connection with the injector, which is driven by the electromagnetic drive arrangement. However, it should be understood that the injection nozzle of the present invention can be applied to any suitable injector regardless of the drive method of the nozzle needle. For example, the injection nozzle can be applied to an injector of a diesel engine, in which a nozzle needle is lifted by, for example, fuel pressure or can be applied to an injector of a common rail system, in which lifting of a nozzle needle is controlled through control of pressure of a back pressure chamber, which urges the nozzle needle in an injection hole closing direction.

Furthermore, in the first to the fourth embodiments, the present invention is discussed with reference to the case where the single injection hole is provided in the nozzle body. However, the number of the injection hole(s) is not limited to one and can be varied based on the characteristics of the engine.

Also, in the first embodiment, it is possible to form the coating layer 52 only in a part of the engaging portion 51, if desired.

Additional advantages and modifications will readily occur to those skilled in the art. The invention in its broader terms is therefore not limited to the specific details, representative apparatus, and illustrative examples shown and described.

What is claimed is:

1. A fuel injection nozzle comprising:
   a nozzle body that includes a fuel injection hole and a valve seat, wherein the valve seat is located on an inlet side of the fuel injection hole; and
   a nozzle needle that includes an engaging portion, which is seatable against the valve seat to stop fuel injection through the injection hole, wherein:
   the nozzle needle has a coating layer in an outer wall of the nozzle needle;
   the coating layer is made of a lipophobic material; and
   the coating layer is arranged to satisfy the following relationship:

$$T \leq 0.01 \times H,$$

where "T" is a thickness of the coating layer, and "H" is a distance between the nozzle body and the nozzle needle, which is measured at a narrowest cross sectional point in a fuel passage defined between the nozzle body and the nozzle needle on a downstream side of an upstream end of the engaging portion when an amount of lift of the nozzle needle is maximized.

2. The fuel injection nozzle according to claim 1, wherein the coating layer extends distally from a predetermined point of the nozzle needle, which is located distally of the engaging portion.

3. The fuel injection nozzle according to claim 1, wherein the coating layer covers at least a portion of the engaging portion.

4. The fuel injection nozzle according to claim 1, wherein the nozzle body includes a nozzle plate, in which the fuel injection hole is formed, wherein a generally flat space is defined between the nozzle needle and the nozzle plate.

5. The fuel injection nozzle according to claim 4, wherein the coating layer is formed in a distal end surface of the nozzle needle, which is opposed to the nozzle plate.

6. A fuel injection nozzle comprising:
   a nozzle body that includes a fuel injection hole and a valve seat, wherein the valve seat is located on an inlet side of the fuel injection hole: and
   a nozzle needle that includes an engaging portion, which is seatable against the valve seat to stop fuel injection through the injection hole, wherein:

the nozzle needle has a coating layer in an outer wall of the nozzle needle;

the coating layer is made of a lipophobic material;

the nozzle body includes a nozzle plate, in which the fuel injection hole is formed, and a generally flat space is defined between the nozzle needle and the nozzle plate;

the coating layer is formed in a distal end surface of the nozzle needle, which is opposed to the nozzle plate; and the generally flat space is defined to satisfy the following relationship:

$$h \leq 1.5 \times d,$$

where "h" is a distance between the distal end surface of the nozzle needle and the nozzle plate in the generally flat space, and "d" is an inner diameter of the fuel injection hole formed in the nozzle plate.

7. The fuel injection nozzle according to claim 1, wherein the fuel injection nozzle is for a direct injection internal combustion engine, which has a combustion chamber and directly injects fuel into the combustion chamber.

8. The fuel injection nozzle according to claim 7, wherein a distal end of the fuel injection nozzle is exposed in the combustion chamber.

9. A manufacturing method of a fuel injection nozzle, which includes a nozzle body and a nozzle needle, wherein the nozzle body includes a fuel injection hole and a valve seat, and the nozzle needle includes an engaging portion, which is provided in a distal end of the nozzle needle and is seatable against the valve seat to stop fuel injection through the injection hole, the manufacturing method comprising:

soaking the distal end of the nozzle needle in a liquid state lipophobic material to a predetermined depth to apply the lipophobic material to the distal end of the nozzle needle; and rotating the nozzle needle about an axis of the nozzle needle in a circumferential direction of the nozzle needle when the lipophobic material applied to the distal end of the nozzle needle has liquidity.

10. The manufacturing method according to claim 9, further comprising blowing air to the lipophobic material applied to the distal end of the nozzle needle.

11. A manufacturing method of a fuel injection nozzle, which includes a nozzle body and a nozzle needle, wherein the nozzle body includes a fuel injection hole and a valve seat, and the nozzle needle includes an engaging portion, which is provided in a distal end of the nozzle needle and is seatable against the valve seat to stop fuel injection through the injection hole, the manufacturing method comprising:

soaking the distal end of the nozzle needle in a liquid state lipophobic material to a predetermined depth to apply the lipophobic material to the distal end of the nozzle needle; and rotating the nozzle needle about a perpendicular axis, which is perpendicular to the axis of the nozzle needle, when the lipophobic material applied to the distal end of the nozzle needle has liquidity.

12. The manufacturing method according to claim 11, further comprising blowing air to the lipophobic material applied to the distal end of the nozzle needle.

13. A manufacturing method of a fuel injection nozzle, which includes a nozzle body and a nozzle needle, wherein the nozzle body includes a fuel injection hole and a valve seat, and the nozzle needle includes an engaging portion, which is provided in a distal end of the nozzle needle and is seatable against the valve seat to stop fuel injection through the injection hole, the manufacturing method comprising:

soaking the distal end of the nozzle needle in a liquid state lipophobic material to a predetermined depth to apply the lipophobic material to the distal end of the nozzle needle: and cutting at least a portion of the lipophobic material applied to the distal end of the nozzle needle to adjust at least one of an area of the lipophobic material and a thickness of the lipophobic material, so that the lipophobic material forms a predetermined coating layer in the distal end of the nozzle needle.

14. The manufacturing method according to claim 13, further comprising blowing air to the lipophobic material applied to the distal end of the nozzle needle.

* * * * *